April 19, 1960 D. D. MacLAREN 2,933,446
FLUIDIZED PLATINUM REFORMING PROCESS
Filed Feb. 11, 1958
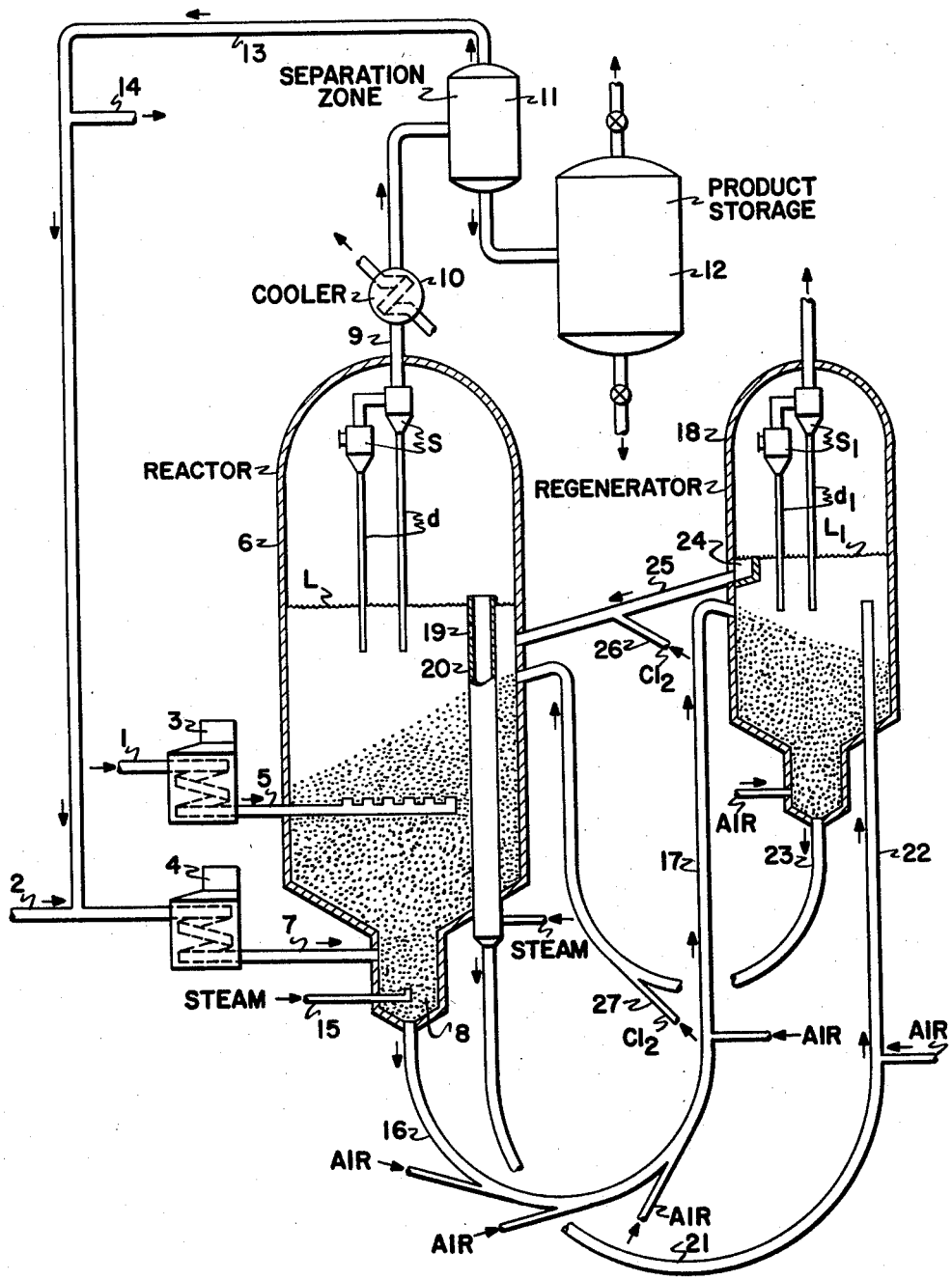
Donald D. MacLaren Inventor
By Cushman Attorney 大
United States Patent Office 2,933,446
Patented Apr. 19, 1960

2,933,446

FLUIDIZED PLATINUM REFORMING PROCESS

Donald D. MacLaren, Scotch Plains, N.J., assignor to Esso Research and Engineering Company, a corporation of Delaware Application February 11, 1958, Serial No. 714,599

9 Claims. (Cl. 208—65)

The present invention relates to improvements in the catalytic hydroforming of naphthas. More particularly, this invention relates to employing two different particle sizes of supported-platinum catalysts, one of which particle sizes is such that it is at least 200 microns, and the other a conventional fluidizable size, wherein the larger-size catalyst first contacts the naphtha feed oil, and thereafter the fluidizable catalyst contacts said feed oil, and the larger-size catalyst has a greater amount of platinum and a lesser amount of chlorine, and the smaller size has the lesser amount of platinum and the larger amount of chlorine.

The invention is based on the observation in fixed bed catalytic reforming, employing a plurality of reactors, that the critical platinum content of the catalyst varies with the type of reaction desired. For example, maximum conversion of naphthenes to aromatics is obtained with about 0.3–0.6 wt. percent platinum on alumina, while maximum dehydrocyclization and isomerization of paraffins is achieved with as little as 0.03–0.1 wt. percent platinum on alumina. The chlorine content of the catalyst is also critical. In the case of dehydrogenation of naphthenes, the chlorine content should be limited to about 0.4 wt. percent or less to restrict hydrocracking and minimize formation of gaseous products. On the other hand, chlorine promotes cyclization and isomerization of paraffins and for this purpose chlorine contents of 0.5–1.5 wt. percent are employed. Normal reformer feed stocks contain both naphthenes and paraffins. Thus, it is desirable to reform with catalyst containing two different platinum and chlorine contents to achieve maximum conversion and selectivity. Ideally, the feed would first be contacted with about a 0.3–0.6 wt. percent platinum catalyst containing from 0.0 to 0.4 wt. percent chlorine to convert all the naphthenes to aromatics with minimum gaseous material formation. The partially reformed feed would then contact catalyst containing less than 0.1 wt. percent platinum but at least 0.5 wt. percent chlorine to achieve maximum conversion and selectivity on the paraffin portion. Such an operation can be readily carried out in fixed bed operations by putting the high platinum content catalyst in the lead reactor and possibly second reactor and the low platinum and high chlorine content catalyst in the remaining reactors.

The object of the present invention is to carry out a hydroforming process designed to insure maximum conversion and selectivity of desired products.

Another object of this invention is to provide a method for hydroforming naphthas in a fluidized catalyst system employing a platinum catalyst wherein the naphtha feed first contacts a catalyst of "shot" size with the larger content of platinum and the smaller content of chlorine, and then contacting the partially reformed naphtha with a fluidized catalyst having a smaller percentage of platinum and a larger percentage of chlorine than the "shot" size catalyst.

Another object of the present invention is to contact feed oil to be hydroformed first with a catalyst of relatively large size and thereafter to treat it in the same generally confined space with catalyst of fluidizable size which has been treated with chlorine or the like so that it contains a larger amount of chlorine.

Another object of the invention is to omit treating the larger size catalyst with chlorine and to treat only the fluidizable catalyst with chlorine.

Other objects of the present invention will appear in the ensuing description and claims.

In the accompanying drawing, there is set forth a suitable apparatus in which a preferred modification of the invention may be carried into effect.

Referring in detail to the drawing, a naphtha fraction to be hydroformed is introduced into the present system through line 1 and simultaneously hydrogen-containing gas is also introduced into the present system through line 2. The naphtha is heated in furnace 3 to a temperature of about 1000° F., while the hydrogen containing gas is heated in furnace 4 to a similar temperature. The naphtha vapors pass through line 5 and are charged to reactor 6 while the hydrogen-containing gas passes through line 7 and is charged to a lower point in the reaction zone. The reactor 6 contains a bed of fluidized catalyst extending from the bottom thereof to an upper dense phase level "L." "Shot" size catalyst is introduced into the reactor 6 through line 23 and since it is larger in size than the fluidized catalyst, it settles toward the bottom of the reactor. The rate at which the "shot" catalyst settles decreases as its concentrations increase near the bottom of the reactor. Thus the entering feed first contacts a bed containing a major portion of "shot" catalyst. After contacting the larger size catalyst, the oil vapor and gasiform material pass upwardly and contact the fluidizable size catalyst where the reaction is completed. Under conditions more fully set forth in a specific example, the desired conversion takes place and the hydroformed product passes through the bed of "shot" size catalyst and fluidizable size catalyst and passes into the catalyst disengaging space positioned between "L" and the top of the reactor. Before the oil vapors and hydrogen-containing gas exit from the reactor they are passed through one or more cyclones "S" in which entrained catalyst is separated and returned to the main body of catalyst through dip pipe "d." The products exit from the reactor 6 through line 9, are cooled in a cooler 10 to a temperature of about 100° F., passed into separator 11 and the product is recovered from the bottom thereof and delivered to product storage 12. The recycle hydrogen-containing gas is recovered overhead through line 13 and returned to the process. A portion of this recycled gas is withdrawn from the system through line 14.

During use, the catalyst acquires carbonaceous and other deposits and in order to remove said deposits, the "shot" size catalyst and the fluidizable catalyst must be regenerated. First, in connection with the "shot" size catalyst the latter, as stated, descends toward and concentrates at the bottom of the reactor in a non-fluidized state. The hydrogen-containing recycle gas entering through line 7 serves to strip any occluded fluidized catalyst from the "shot" catalyst. The "shot" catalyst then enters a zone of reduced cross section 8 where occluded recycle gas is stripped with steam entering through line 15. The rate of steam flow is so adjusted to the rate of "shot" catalyst flow that an interface of steam and recycle gas is maintained in this zone. The larger size catalyst passes into transfer line 16, is elevated by air introduced at multiple points around the U-bend and at the bottom of the riser leg 17 and is led into the regenerator vessel 18, as shown, below the point at which the fluidized catalyst enters. Fluidizable catalyst is withdrawn from an upper point through a port 19 in stripper 20, where at the bottom thereof, steam is introduced to the strip the catalyst of adhering oil and thereafter introduced into regenerator 18 via transfer line 21 aided by air introduced into riser leg 22. Air is introduced into the bottom or well portion of regenerator 18 and under conditions more fully set forth hereafter in the specific example, both sized catalysts undergo regeneration and the substances contaminating the same are consumed by combustion.

The smaller size catalyst entering through transfer line 22 forms the dense fluidized bed in the regenerator. As in the reactor, the "shot" catalyst enters below the point at which the fluidized catalyst enters and settles through the fluidized bed. Heat liberated by regenerating the "shot" catalyst is immediately dissipated by the fluidized bed of catalyst, thereby controlling regenerator temperature. Depending on the feed and operating pressure, sufficient heat may or may not be liberated by combustion in the regenerator to provide for a heat balance operation. If additional heat is required, torch oil, or the like, may be burned in the fluidized bed of the regenerator. As in the reactor, the "shot" catalyst settles to the bottom of the regenerator where occluded fluidized catalyst is stripped out by air entering at the regenerator bottom. The regenerated "shot" catalyst is then conveyed to reactor 6 through line 23 with the aid of recycle gas, if required. The fluidizable catalyst overflows into a well 24 at the top of the regenerator and is transported back to the reactor through line 25. As previously described, one of the purposes of this invention is to provide for the optimum chlorine contact of the catalyst at various phases in the hydroforming reaction. For this reason, the major chlorine treat is given to the fluidizable catalyst in transfer line 25, by injecting chlorine into one or more lines 26. Because chlorine promotes hydrocracking, only a limited amount of chlorine is added to the "shot" catalyst in transfer line 23 through one or more lines 27. In certain cases external treating vessels may be provided to carry out these chlorine treats rather then by injection into the transfer lines.

In order to explain the invention more fully, the following specific example is set forth.

Conditions in reactor 6

| | |
|---|---|
| Fluidizable catalyst: | Range |
|    Platinum _____wt. percent__ | 0.03–0.1 |
|    Size _____mu__ | 10–150 |
|    Chlorine _____wt. percent__ | 0.7–1.0 |
| "Shot" catalyst: | |
|    Platinum _____ | 0.3–0.6 |
|    Size _____mu__ | 200–1200 |
|    Chlorine _____wt. percent__ | 0.0–0.4 |
| Temperature _____° F__ | 900–975 |
| Pressure _____p.s.i__ | 50–500 |
| Feed rate w./h./w. overall _____ | 0.5–5 |
|    "Shot" catalyst _____ | 1.5–15 |
|    Fluid catalyst _____ | 0.15–1.5 |
| Ratio of "shot" size/fluidizable size circulated _____ | 2–6 |

Conditions in regenerator

| | |
|---|---|
| Temperature _____° F__ | 1025–1150 |
| Pressure _____p.s.i__ | 50–500 |
| Contact time _____min__ | 5–30 |

| Operation | This Invention | Conventional Fixed Bed |
|---|---|---|
| Feed Inspections: | | |
|   Boiling Range, °F | 190–305 | 190–305 |
|   Gravity, °API | 62.2 | 62.2 |
| Component Analysis: | | |
|   Paraffins | 62.0 | 62.0 |
|   Naphthenes | 29.1 | 29.1 |
|   Aromatics | 8.9 | 8.9 |
| Yield at 98 Research Octane Clear: | | |
|   $C_5+$ Gasoline, Volume Percent | 72.0 | 69.9 |
|   $C_4$, Volume Percent | 11.5 | 12.8 |
|   Dry Gas, Wt. Percent | 14.8 | 16.4 |
| $C_5+$ Gasoline Composition: | | |
|   Paraffin | 34.5 | 34.5 |
|   Naphthenes | 1.5 | 1.5 |
|   Aromatics | 64.0 | 64.0 |

It will be noted that in the foregoing example there is an increased yield of $C_5+$ gasoline at 98 research octane gasoline amounting to over 2%. This is due to the fact that the present process produces less gas. While not attempting to predict any theory, it is believed that the data show that the omission, or at least a decreased amount of chlorine added to the "shot" size catalyst has resulted in the improvement shown.

To recapitulate, the present invention relates to the use of "shot" size catalyst and a fluidizable-size catalyst, in that order, for hydroforming of naphthas, and it is further characterized in that "shot" size catalyst contains about 0.3–0.6 wt. percent platinum on an active form of alumina preferably alumina prepared by the "alcoholate" method while the fluidizable catalyst contains only about 0.03–0.1 wt. percent Pt and about 0.7–1.0 wt. percent chlorine. The "shot" catalyst contacts the feed as it enters the reaction zone, and because a catalyst containing about 0.3–0.6 wt. percent platinum is an excellent dehydrogenation catalyst, the naphthene content of the feed is substantially completely converted to the corresponding aromatics without hydrocracking due to excessive chlorine content. Thereafter the feed contacts fluidizable catalyst which contains about 0.03 to 0.1 wt. percent platinum plus 0.7–1.0 wt. percent chlorine and the hydroforming is completed in contact with this catalyst. Chlorine is added to this catalyst in the transfer line to the reactor in order to improve its hydrocracking potential. The "shot" size catalyst and the fluidizable catalyst are separately withdrawn from the reaction zone and treated in a single regeneration zone to restore their activity. However, they are again separated and are returned to the reaction zone at different points thereof, the "shot" size catalyst enters at a point somewhat below that of the point of entry of the fluidized catalyst. The "shot" size catalyst settles through the bed in a manner analogous to a solid-liquid settler whereas the fluidizable catalyst forms a conventional fluid bed of catalyst in the reaction zone.

Numerous modifications of the present invention may be carried out by those who are familiar with the art without departing from the spirit thereof.

What is claimed is:

1. The method of continuously hydroforming a naphtha in the presence of a platinum-alumina catalyst of two distinct particle sizes which comprises charging the naphtha together with a hydrogen-containing gas to reaction zone maintained at 900–975° F. and 50–500 p.s.i.g. where it first contacts a large size catalyst in the form of "shot" and also having a platinum content of 0.3 to 0.6 wt. percent and a chlorine content of 0 to 0.4 wt. percent whereby the naphthene constituents of the feed are substantially all converted to the corresponding aromatic, thereafter contacting the partially converted feed in the same reaction zone with a fluidizable sized catalyst where the platinum content is 0.03–0.1 wt. percent and the chlorine content is 0.7–1.0 wt. percent whereby the hydroforming is substantially completed and recovering overhead from the reaction zone an improved yield of product.

2. The method of continuously hydroforming a naphtha in the presence of a regenerable platinum-alumina catalyst of two distinct particle sizes which comprises charging the naphtha together with a hydrogen-containing gas to reaction zone maintained at 900–975° F. and 50–500 p.s.i.g. where it first contacts a large size catalyst in the form of "shot" and also having a platinum content of 0.3 to 0.6 wt. percent and a chlorine content of 0 to 0.4 wt. percent whereby the naphthene constituents of the feed are substantially all converted to the corresponding aromatic, thereafter contacting the partially converted feed in the same reaction zone with a fluidizable sized catalyst where the platinum content is 0.03–0.1 wt. percent and the chlorine content is 0.7–1.0 wt. percent whereby the hydroforming is substantially completed and recovering overhead from the reaction zone an improved yield of product.

3. The method of claim 2 in which the fluidizable catalyst following regeneration is treated with chlorine.

4. The method of continuously hydroforming a naphtha which comprises providing a reaction zone and a regeneration zone and intercommunicating transfer lines between the two said zones charging a naphtha to the reaction zone maintained at 900–975° F. and 50–500 p.s.i.g. and a hydrogen-containing gas to said reaction zone containing a body of platinum alumina catalyst of two distinct widely different particle sizes and in which the naphtha first contacts the larger size catalyst, the said catalyst of large size having a platinum content of 0.3 to 0.6 wt. percent and a chlorine content of 0 to 0.4 wt. percent whereby the naphthene content of the feed oil are substantially converted to the corresponding aromatic, thereafter contacting the partially converted feed in the same reaction zone in the presence of a fluidizable catalyst having a platinum content of 0.03–0.1 wt. percent and a chlorine content of 0.7–1.0 wt. percent separately withdrawing both sized catalysts and conveying them to said regeneration zone where they are treated with an oxygen-containing gas at elevated temperatures for the purpose of combusting contaminants on the catalyst and separately returning the regenerator catalyst to the reaction zone, and recovering from the process a hydroformed product in increased yields.

5. The method of claim 4 in which the large size catalyst is introduced into both the reactor and the regenerator at a point below the upper dense phase level of the fluidized catalyst wherein it settles downwardly through the bed and is concentrated in the respective beds in the lower portion thereof.

6. The process set forth in claim 5 in which the large size catalyst is of a size equal to approximately 200–1200 microns.

7. The method set forth in claim 4 in the regenerator a torch oil is burned to provide a substantially heat balanced reaction.

8. The method of claim 4 in which the large size catalyst contains 0 wt. percent chlorine.

9. The method of hydroforming naphtha vapors in the presence of a platinum-alumina catalyst of two distinct particle sizes and distinct contents of platinum and chlorine which comprises charging naphtha hydrocarbons to be hydroformed with hydrogen-containing gas to a reaction zone where naphtha vapor and the gas first contact a large size catalyst in the form of "shot" having a platinum content of 0.3 to 0.6 wt. percent and a chlorine content of 0 to 0.4 wt. percent at a temperature in the range of 900 to 975° F. so that naphthene components of the naphtha vapor are converted to aromatic hydrocarbons in contacting with feed "shot" catalyst settling toward the bottom of the reaction zone, then contacting the thus converted naphtha hydrocarbons with the gas with an upper bed of fluidized catalyst of smaller size in the same generally confined reaction zone, said smaller sized catalyst having a platinum content of 0.03 to 0.1 wt. percent and a chlorine content of 0.7 to 1.0 wt. percent for effecting hydrocracking of naphtha components in the vapor, withdrawing the spent "shot" size catalyst which concentrates at the bottom of said zone for regeneration by burning of carbon deposits therefrom, withdrawing the spent fluidized catalyst for regeneration by combustion of carbon deposits thereon, returning the regenerated fluidized catalyst treated with chlorine to maintain the above stated chlorine content separately from the regenerated "shot" catalyst, and returning the regenerated "shot" catalyst to a lower part of the reaction zone.

References Cited in the file of this patent

UNITED STATES PATENTS

| | | |
|---|---|---|
| 2,443,673 | Atwell | June 23, 1948 |
| 2,763,596 | Feldbauer et al. | Sept. 18, 1956 |
| 2,765,264 | Pasik | Oct. 2, 1956 |
| 2,781,298 | Haensel et al. | Feb. 12, 1957 |

FOREIGN PATENTS

| | | |
|---|---|---|
| 686,641 | Great Britain | Jan. 28, 1953 |